Oct. 25, 1966  G. W. PALMER  3,281,181
AIR DEFLECTOR FOR AUTOMOBILES
Filed May 20, 1964
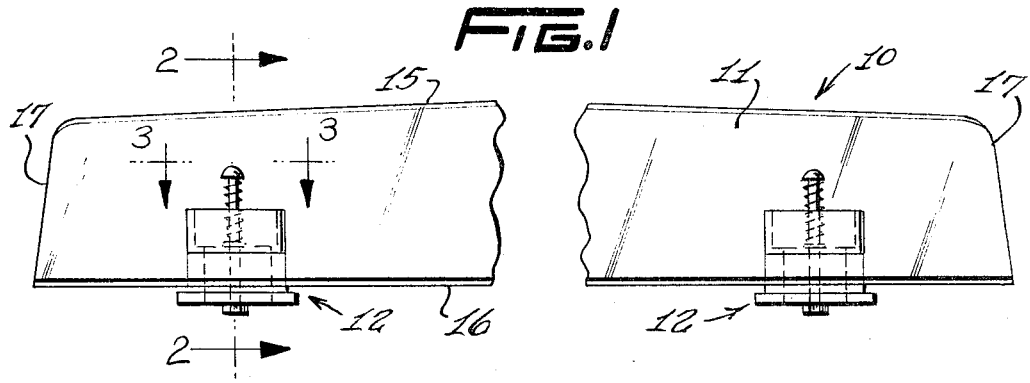
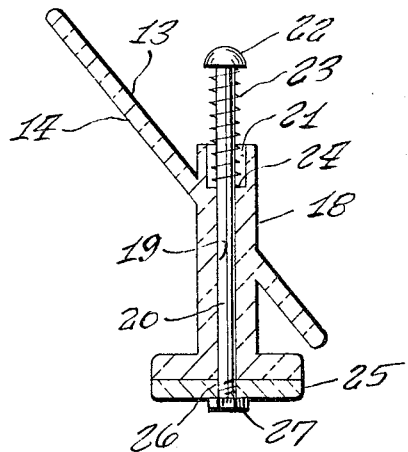
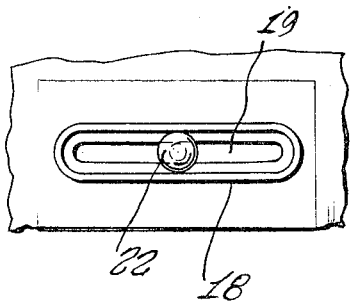
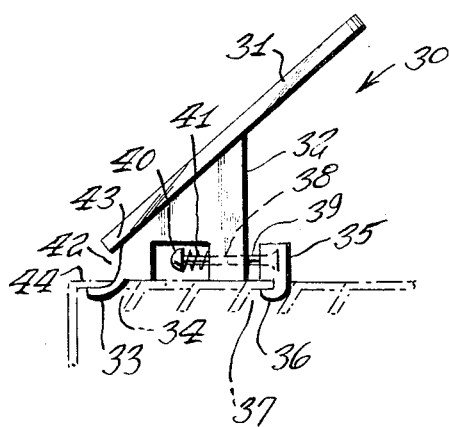
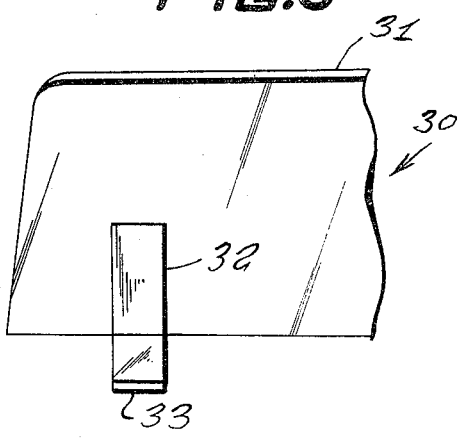

United States Patent Office 3,281,181
Patented Oct. 25, 1966

3,281,181
AIR DEFLECTOR FOR AUTOMOBILES
George W. Palmer, San Diego, Calif.
(8 Santa Paula St., Susanville, Calif.)
Filed May 20, 1964, Ser. No. 368,868
1 Claim. (Cl. 296—91)

This invention relates generally to automotive accessories. More specifically, it relates to air deflectors which may be detachably attached to an automotive vehicle.

It is generally well known by motorists that travel in mid-summer and when crossing arid places, such as deserts, it can become very uncomfortable. Most automotive vehicles made since 1959 are equipped with air slots on the cowl immediately in front of the windshield in order to draw cool air into the interior of the vehicle in the area of feet of the occupants of the vehicle. It is, however, well known that when driving in great heat the air slots are unable to deliver a sufficient quantity of air and the foot area can become extremely uncomfortable for the driver and his passengers.

Accordingly, it is a principal object of the present invention to provide an air deflector for automobiles which during excessive heat will deliver a larger quantity of air into the vehicle and thereby keeping the motorist and the passengers comfortably cool, especially in the area of the feet.

Another object of the present invention is to provide an air deflector which is readily attachable to a variety of makes and models of automotive vehicles.

Still another object of the present invention is to provide an air deflector which can be easily and quickly attached and detached and which is adaptable for use on vehicles wherein the air slots extend transversely or longitudinally.

Still another object of the present invention is to provide an air deflector which will add ornamental attractiveness to the design of the automobile.

A still further object of the present invention is to provide an air deflector which can be made inexpensively from plastic material or the like and may be made in various colors to harmonize with the colors of the car.

Other objects of the invention are to provide an air deflector bearing the above objects in mind which is of simple construction, has a minimum number of parts, is inexpensive to manufacture and efficient in operation and use.

For other objects and for a better understanding of the invention, reference may be had to the following detailed description taken in conjunction with the accompanying drawing, in which:

FIGURE 1 is a rear view of the present invention shown in elevation;

FIGURE 2 is a cross sectional view taken along the lines 2—2 of FIGURE 1;

FIGURE 3 is a view taken along the lines 3—3 of FIGURE 1;

FIGURE 4 is a side view showing a modified form of the invention; and

FIGURE 5 is a fragmentary rear view of the structure shown in FIGURE 4.

Referring now to the drawing in detail, the numeral 10 represents an air deflector for automobiles wherein there is a deflector plate 11 and a pair of deflector supports 12. The deflector plate comprises a generally flat element made preferably of transparent clear or tinted plastic material having parallel flat upper and lower sides 13 and 14 respectively and being bounded by a top edge 15, a lower edge 16 and side edges 17. It is to be noted that the deflector plate may be slightly arced or bent, if preferred to harmonize with the contour of a car, if preferred. The deflector supports may be integrally formed together with the deflector plate, as indicated in FIGURE 2 of the drawing, each of the supports comprising a vertically upstanding post 18 which supports the deflector plate at an angle relative thereto. The post 18 has a vertically extending central opening 19 therethrough within which a pin 20 is carried. The upper end of the opening 19 is countersunk or counterbored, as shown at 21. The upper end of the pin is provided with a head 22 and a compression coil spring 23 is fitted around the pin between the head and the bottom wall 24 of the counterbore, thus normally urging the pin in an upward direction. A foot element is provided with means for attachment to the pin. The foot element 25 has a vertically extending opening 26 therein through which pin 20 extends. The lower end of the pin is threaded and is secured to a nut 27. It is to be noted that the opening 26 in the foot may be of cylindrical nature, whereas the opening 19 in the post comprises a longitudinal slot extending in a longitudinal direction.

In operative use, the foot of each support is inserted into an air slot of the automobile cowl, the pin depressed, and the foot rotated until the ends thereof are under the adjacent ribs between the air slots. The pin is then released and the spring urges the pin upwardly, causing the foot of each post to bear against the ribs between the slots. Thus, the air deflector is quickly and easily secured to the automobile. It is to be noted that in this construction, the device is adaptable for vehicles wherein the air slots extend in a transverse direction. Since the air slots in different makes and models of vehicles are at various distances apart, the slotted openings 19 permit adjustability of the device for the various sizes in the vehicles.

A modified construction of the invention is shown in FIGURES 4 and 5 which is adaptable for automobiles wherein the air slots extend transversely and wherein the air deflector 30 includes a deflector plate 31 carried in tilted position upon posts 32 wherein there is a spur 33 which is engagable within one of the air openings 34 of the automobile. A movable foot 35 is provided with a hook 36 which is receivable in another air slot 37, the hook being capable of being secured to the edge thereof. A horizontal opening 38 in the post receives a pin 39, one end of which is secured to the movable foot, the other end of the pin having an enlarged head 40 and there being a compression coil spring 41 adjacent the head for urging the movable foot to remain in engagement with the edge of the slot. It is to be noted that the longitudinal opening 42 is provided between the rear lower end 43 of the deflector plate and the upper side of the automobile cowl for allowing bugs to escape.

In operative use, the air deflector is mounted upon the automobile with the raised upper edge of the deflector plate extending forwardly. When the vehicle is in motion, air strikes the lower side of the deflector plate and is forced downwardly through the air slots of the automobile for an additional quantity of air and providing better cooling.

While various changes may be made in the detail construction, it shall be understood that such changes shall be within the spirit and scope of the present invention as defined by the appended claim.

What is claimed is:

An air deflector for automobiles comprising, in combination, a deflector plate adapted to harmonize with the contour of an automobile, said plate being made of transparent material and provided with upper and lower sides, a pair of deflector supports integrally formed with said plate, said each support including a vertical post for supporting said deflector plate at an inclined angle relative thereto, said each post being provided with a vertically extending slot having a countersunk portion at its upper end, a pin within said slot, an enlarged semi-spherical head secured to the upper end of said pin, a compression coil spring carried by said pin between said head and the bottom portion of said countersunk portion of the slot, a circular foot element at the bottom portion of said pin rotatably carried on the lower end thereof and being capable of securing said deflector within the air slots of the automobile cowl when the pin is depressed and the foot element is rotated in such a manner that the ends thereof are under the ribs between said air slots, thereby causing said foot element of said post to bear against said ribs between said slots when said pin is released and said spring urges said pin to an upward direction.

References Cited by the Examiner

UNITED STATES PATENTS

| | | | |
|---|---|---|---|
| 1,385,255 | 7/1921 | Lunt | 296—94 X |
| 2,229,516 | 1/1941 | Metzger | 296—91 |
| 2,679,201 | 5/1954 | Scharmen | 296—84 |

BENJAMIN HERSH, *Primary Examiner.*

P. GOODMAN, *Assistant Examiner.*